Jan. 4, 1949.  A. W. BURKS  2,457,863
AIR CHARGER
Filed Feb. 1, 1945  2 Sheets-Sheet 1
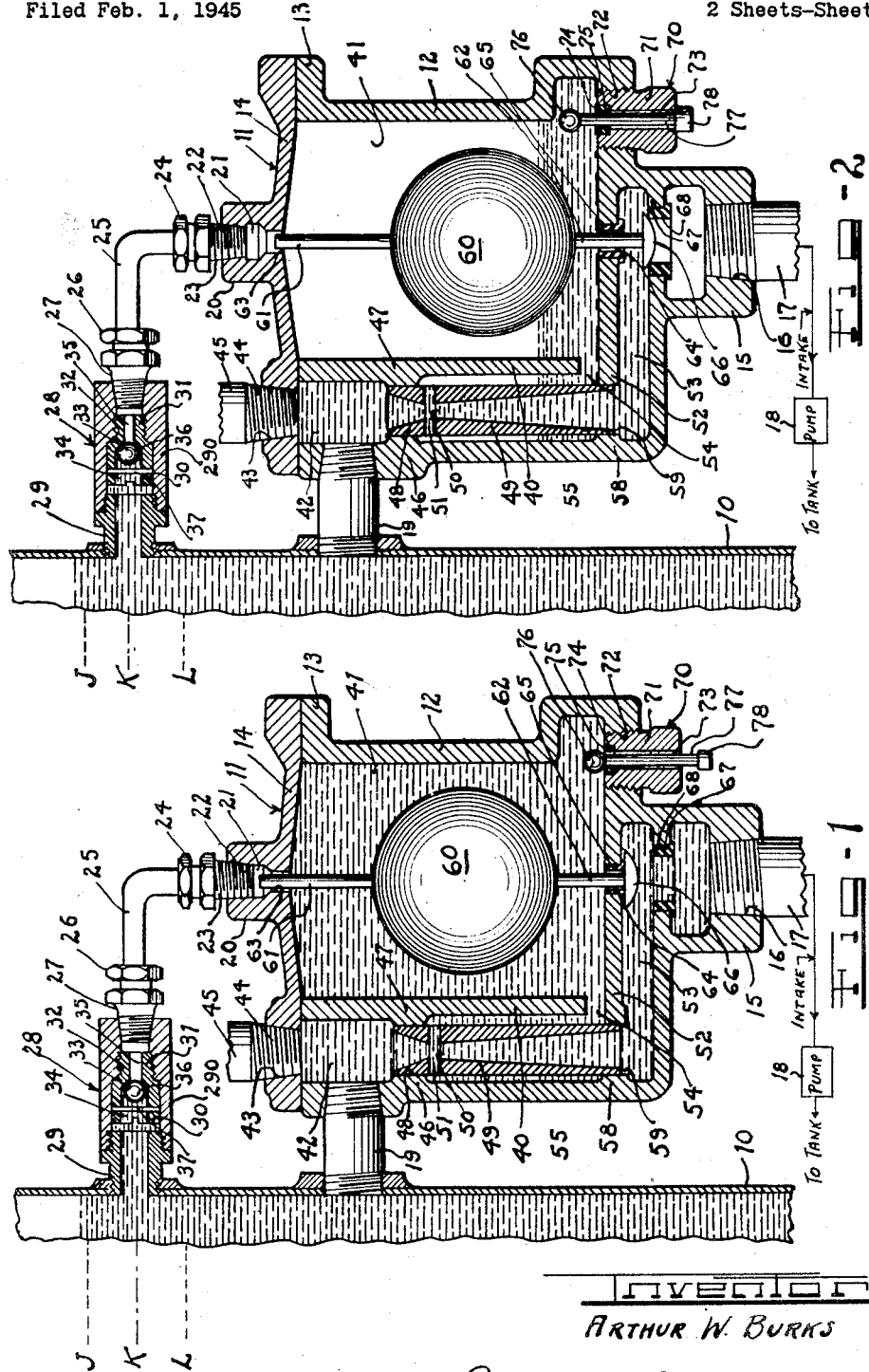
Inventor
ARTHUR W. BURKS
by The Firm of Charles W. Hills
Attys

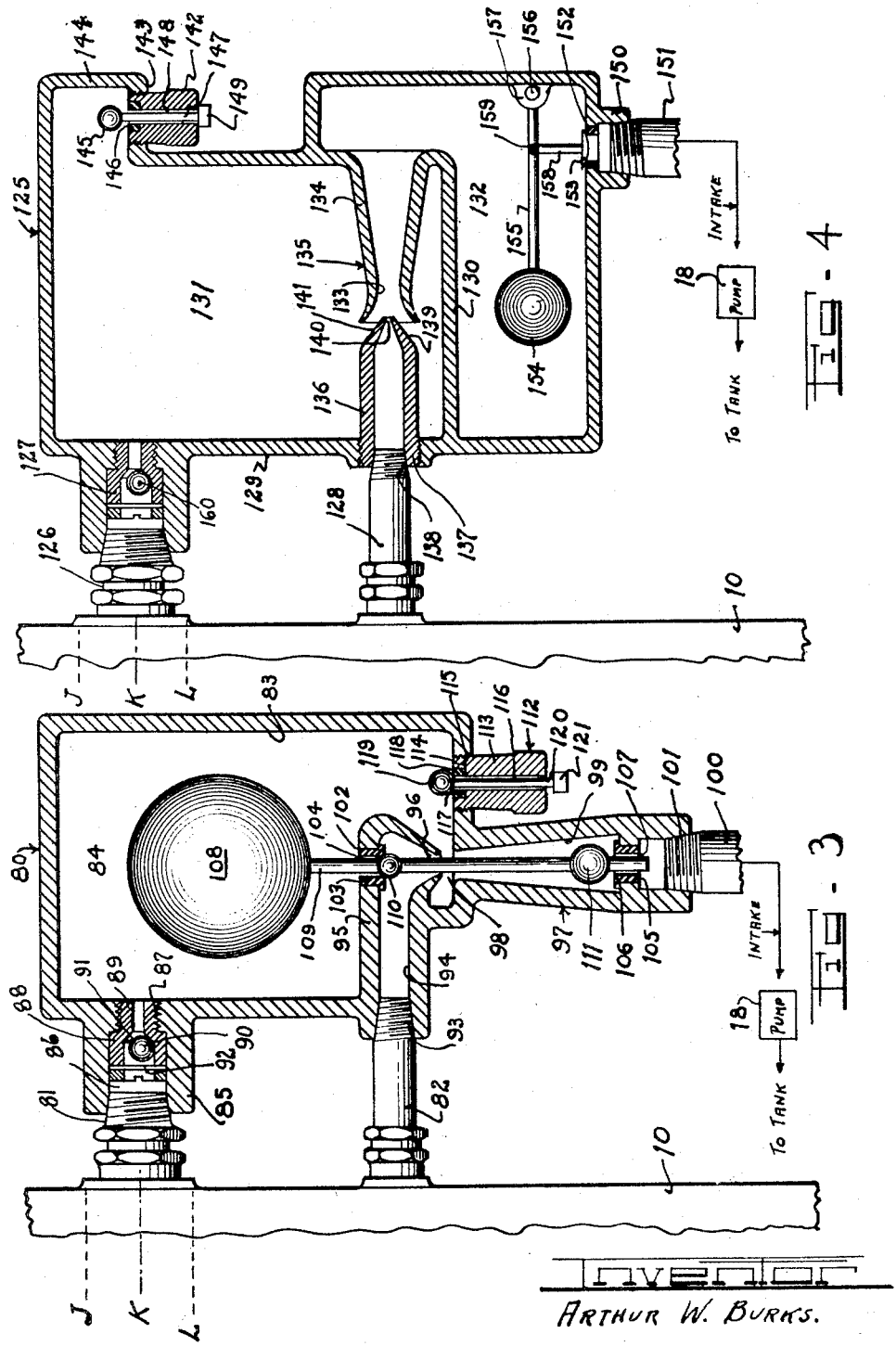

Patented Jan. 4, 1949

2,457,863

UNITED STATES PATENT OFFICE 2,457,863

AIR CHARGER

Arthur W. Burks, Decatur, Ill., assignor to Decatur Pump Company, Decatur, Ill., a corporation of Illinois Application February 1, 1945, Serial No. 575,693

9 Claims. (Cl. 103—6)

This invention relates to an air charger that is primarily adapted for maintaining pressure in a hydro-pneumatic tank such as is used in many water supply systems.

In hydro-pneumatic water supply systems such as disclosed in my issued Patents Nos. 2,172,057 and 2,172,097, both dated September 5, 1939, the problem is to maintain the desired pneumatic pressure above the level of the water in the supply tank so that the tank pressure may be maintained at the desired point. Due to the absorption of air by the water and to the loss of air, the tendency is for the pneumatic pressure to drop during continued use of the system. A number of different devices, including those of my issued patents, have been devised for supplying air to the hydro-pneumatic tank in accordance with the pressure in the tank and in response to the operation of the pump that supplies the tank with water.

The present invention relates to a novel and improved air charger mechanism for maintaining the pneumatic pressure within a hydro-pneumatic supply tank. The air charger of my invention operates in response to the pressure in the hydro-pneumatic tank and also in response to the suction effect created at the intake of the water pump supplying the tank, when such pump is operated. An important feature of my present invention is the provision of an eductor, or aspirator, operated by a flow of water under pressure obtained either from the hydro-pneumatic tank itself or from some outside source. The eductor is arranged in a casing or housing that also provides a chamber in flow communication with the low pressure area of the eductor whereby upon pressure flow of water through the eductor, water is drawn from the chamber and is replaced by air admitted through an air intake valve. A float valve for controlling the flow of water through the eductor to the intake side of the pump is actuated by a float within said chamber so as to shut off said flow when the chamber becomes substantially filled with air. Thereafter, the continued flow of water into the eductor passes into the chamber to expel the charge of air back into the tank.

The air charger of my invention thus acts each time the pump is started up, and as frequently as necessary while the pump continues to operate, to introduce a charge of air into the hydro-pneumatic tank if the pressure therein is below a predetermined point. If no air is needed in the hydro-pneumatic tank to make up for losses, then no new charge of air is delivered into the tank, but air is merely withdrawn from the tank and expelled back into the tank. The device is thus fully automatic and requires little, if any, attention.

It is therefore an important object of this invention to provide an automatically operating air charger for maintaining the desired pneumatic pressure in a hydro-pneumatic tank of a water supply system, the air charger being responsive to the tank pressure and the suction effect produced by the operation of the water supply pump to introduce a charge of air into the hydro-pneumatic tank whenever said pump is operated provided there is a deficiency of air pressure within the tank.

It is a further important object of this invention to provide an air charger the operation of which depends upon the action of an eductor, or aspirator, in combination with a float valve and a float therefor.

It is a further important object of this invention to provide an air charger for maintaining the desired pneumatic pressure within a hydro-pneumatic tank of a water supply system, the operation of the air charger being responsive to the tank pressure and also to the suction effect of a pump supplying water to the tank, and the air charger mechanism including an eductor operating in accordance with the flow of water under pressure therethrough to draw air into the charger and expel the charge of air into the tank.

Other and further important objects of this invention will be apparent from the disclosure in the specification and the accompanying drawings.

On the drawings:

Figure 1 is a fragmentary, vertical sectional view of a hydro-pneumatic tank and of an air charger embodying the principles of my invention installed in connection therewith, with parts in elevation.

Figure 2 is a similar fragmentary, vertical sectional view illustrating the air charger at another stage of its operation, with parts in elevation.

Figure 3 is a fragmentary, vertical sectional view, with parts in elevation, of a modified form of my invention.

Figure 4 is a fragmentary, vertical sectional view of a further modified form of my invention.

As shown on the drawings:

In Figures 1 and 2, the reference numeral 10 indicates generally a hydro-pneumatic tank in a water supply system such as disclosed in my issued patents, above referred to. Said tank is adapted to be partially filled with water, as for instance to a normal level indicated by the dot and dash line K, but is here illustrated with the water level at a point above said normal water level, as indicated by the dotted line J. Air under pressure is maintained in the space above the water level in the tank.

An air charger of my present invention is indicated generally by the reference numeral 11. Said air charger 11 may suitably comprise a casing 12 having an open flanged top 13 adapted to be closed by a cap 14. The lower portion of the casing 12 is provided with a boss 15 having a threaded bore 16 for receiving the threaded end of a pipe 17 connected to the intake or suction side of a pump diagrammatically shown at 18. Said pump 18 serves to supply water to the tank 10.

The casing 12 is also connected by a nipple 19 to the interior of the tank 10 well below the normal water level K, in order that there may be a constant supply of water under pressure to said casing 12 through the nipple 19. Alternatively, a separate source of supply of water under pressure may be introduced through the nipple 19 into the casing 12. It is merely a matter of convenience to use the water of the hydro-pneumatic tank 10 itself, rather to connect the air charger to a separate source of water under pressure.

The cap 14 is provided with a central upstanding boss 20, which has a base 21 extending therethrough, the upper portion of which is threaded, as at 22, for receiving the threaded end of a nipple 23. Said nipple 23 is connected by a coupling 24 to a tubing 25, the other end of which is attached to a coupling 26 and a threaded nipple 27. Said nipple 27 is threaded into one end of a check valve assembly indicated generally by the reference numeral 28, the other end being in flow communication with the interior of the tank 10 through the medium of a connection 29.

Said check valve assembly 28 comprises an outer sleeve 290 threaded at both ends for connection to the threaded end of the nipple 27 and to the threaded end of the connection 29. A ball cage 30 is positioned within said sleeve 290 with its reduced threaded end 31 threaded into the interior threaded bore 32 of said sleeve. Said cage 30 provides a seat 33 between an enlarged portion 34 and a reduced portion 35 of the bore extending through said cage. A ball 36 is positioned within said enlarged bore portion 34 for seating against said seat 33 under the action of water from the tank 10. A pin stop 37 prevents complete displacement of the bell 36 from the enlarged bore 34 of the cage 30.

By virtue of the construction of the check valve assembly 28, water from the tank 10 cannot pass from the tank into the charger 11 because water will cause the ball 36 to float and seat against the seat 33. Air, on the other hand, can pass in either direction through said check valve assembly 28, since it requires a much higher velocity of air flow to cause the valve 36 to seat than it does in the case of water. Air is thus free to pass in either direction through said check valve assembly 28 in accordance with the conditions obtaining in the tank 10 and the air charger 11, as will be more fully explained hereinafter.

The casing 12 is divided by a vertical partition 40 extending down from the top thereof to a point spaced from the bottom wall of the casing. Said partition 40 provides a relatively large chamber indicated by the reference numeral 41 and a relatively small chamber indicated by the reference numeral 42, the latter being in direct flow communication with the tank 10 through the medium of the nipple 19. The cap 14 is provided with a threaded opening 43 above the chamber 42 for receiving the threaded end 44 of a nipple 45 connected to a pressure gauge (not shown) for indicating the pressure within the tank 10.

Intermediate aligned portions 46 and 47 of the side-wall of the casing 12 and of the partition 40 are enlarged to form a cylindrical opening 48 for receiving an eductor 49. Said eductor comprises a casing having a cylindrical outer surface and conical inner surfaces convergent toward the throat portion 50 of the eductor. A transverse aperture 51 extends through said casing wall at said throat portion 50. Said aperture 51, as is well understood by those skilled in the art, functions to permit the expiration of fluid from the outside of said casing into the flow of fluid passing through said throat 50, due to the reduction in pressure effected by the restriction at said throat portion.

The casing 12 is also formed with a horizontal partition 52, spaced above the lower wall of said casing to form a shallow chamber 53 and spaced below the bottom edge of the vertical partition 40 to provide a passage 54. Said pasasge 54 forms a flow communication between the chamber 41 and an annular chamber 55 surrounding the eductor 49. Said horizontal partition 53 further cooperates with an enlargement 58 on the inside of the casing wall to provide a cylindrical aperture 59 for receiving the discharge end of the eductor 49. Said eductor 49 thus establishes flow communication between the chambers 42 and 53, and is also in flow communication through the apertures 51, through the annular chamber 55 with the main chamber 41.

A float 60 is mounted within the chamber 41 with its guiding stem portions 61 and 62 extending through openings 63 and 64 into the bore 21 and into the chamber 53, respectively. The opening 64, which is provided in the horizontal baffle 52, has a resilient liner 65 forming a seat for the upper surface of the valve 66 mounted on the depending end of the lower stem portion 62. The lower boss 15 is internally apertured as at 67 and the aperture fitted with a resilient sleeve 68 that forms a seat for the lower convex surface of said valve 66. Said valve 66 thus controls the passage of fluid through the aperture 67 into the piping 17. The float valve 66 also controls the port 64 between the chambers 41 and 53.

An air intake valve assembly, indicated generally by the reference numeral 70, is positioned in the lower wall of the casing 12. Said air intake valve assembly 70 comprises a threaded bushing 71 threaded into the lower wall of the casing 12, as at 72, and provided with a bore 73 extending completely therethrough. The upper end of said bore 73 is counterbored as at 74 and provided with a resilient valve seat 75 for receiving a ball 76. Said ball 76 has an attached stem 77 that extends freely through said bore 73. The end of said stem 77 is enlarged as at 78 to prevent complete upward displacement of said ball 76. Normally the ball 76 seats upon the seat 75, but when there is a sufficient reduction of pressure within said chamber 41, the ball raises to admit air through the bore 73 into said chamber.

The operation of the air charger illustrated in Figures 1 and 2 will now be explained.

When the pump 18 is started, assuming the water level in the tank 10 to be that indicated by the dotted line J, the check valve 33 seats to prevent water from flowing through said check valve assembly 28 from the tank into the air charger 11. The chamber 41 is, however, filled with water from the end of the previous cycle, as illustrated in Figure 1, so that the float 60 holds the valve 66 in its upper position closing the port 64 but opening the port 67. The pressure of water in the tank 10 coupled with the suction created at the intake side of the pump 18 causes a flow of water through the nipple 19 into the chamber 42 and through the eductor 49 into the chamber 53 and out through the port 67 into the pipe 17 leading to the intake of the pump 18. This flow of water through the eductor 49 creates a reduction in pressure at the throat portion 50, causing water to be inducted through the apertures 51 into said throat portion. Water is thus drawn from the chamber 41 and caused to pass through the passage 54 beneath the vertical baffle 40 into the annular chamber 55 surrounding the eductor 49. This water is drawn into the eductor through the apertures 51 and discharged, as previously indicated, into the pipe line 17 leading to the suction side of the pump.

When the water level in the chamber 41 has dropped to a point, such as illustrated in Figure 2, the ball 60 no longer floats and the float controlled valve 66 seats upon the seat 68 to close off communication to the pipe line 17. During the aspiration of the water out of the chamber 41, however, a sufficient reduction in pressure occurs to cause the air intake valve 76 to become unseated, to admit air through the bore 73 into the chamber 41. Thus, by the time the float control valve 66 has closed the opening 67, the chamber 41 has been substantially filled with air.

At this point, with the float control valve 66 seated upon the seat 68, water continues to pass into the air charger from the tank 10 through the nipple 19, but now passes out through the apertures 51 and through the annular chamber 55 into said chamber 41 to fill the same and at the same time expel the charge of air from said chamber 41 out through the pipe 25, the check valve assembly 28 and connection 29 back into the tank 10. The chamber 41 is thus left filled with water, ready for the start of another cycle. So long as the pump continues to operate, this cycle will be repeated, provided that the water level in the tank 10 is at or above the normal water level indicated by the dot and dash line K.

If the water level in the tank 10 falls below the center line of the valve assembly 28, say to the level indicated by the dotted line L, then air will be preferentially drawn in from the tank 10 into the chamber 41 during the operation of the pump 18. This is for the reason that the air in the hydro-pneumatic tank 10 is always at slightly above atmospheric pressure, so that air will be drawn in through the check valve assembly 28 in preference to being taken in through the air intake valve assembly 70. Upon the completion of the cycle, the air taken into the chamber 41 will be expelled back into the tank 10.

Thus, only when the pressure demands of the hydro-pneumatic tank 10 requires it is fresh air introduced into the tank from the atmosphere through the check valve assembly 70.

Figure 3 illustrates a modification of the air charger previously described, but like the air charger of Figures 1 and 2, that of Figure 3 embodies an eductor and float controlled valve for effecting its operation. The modified form of air charger construction, indicated by the reference numeral 80 is connected as before to the hydro-pneumatic tank 10 at about the normal water level K therein by means of a fitting 81, and is also connected at a point substantially below the normal water level in the tank 10 by means of a nipple 82.

The air charger 80 comprises a casing 83 providing a main chamber 84. Said fitting 81 is connected to a threaded boss 85 integral with said casing 83 and having therethrough an enlarged bore 86 and a reduced threaded bore 87. A check valve assembly, indicated generally by the reference numeral 88, is mounted in said bore 86 with the reduced threaded end 89 thereof threaded into said reduced threaded bore portion 87. The check valve assembly 88 is similar to that already described and includes a ball 90 adapted to seat under water pressure against the inclined seat 91. Said ball is held against outward displacement by means of a stop pin 92.

The nipple 82 is connected to the casing 83 by means of an internally threaded bore 93. A passageway 94 is formed inwardly of the boss 93 between the lower wall of the casing 83 and an inwardly extending partition 95. A continuation of said partition 95 and of the lower wall of the casing 83 forms, as at 96, a downwardly tapered restricted throat of an eductor, indicated generally by the reference numeral 97. The throat portion of said eductor 97 is open, as at 98, to provide flow communication with the chamber 84. The elongated tapered discharge portion of the eductor is formed by the downwardly converging tapered wall 99, which may be formed integrally with the casing 83, or may be separately formed. A pipe 100 is connected to the open threaded end 101 of said casing 99 and is also connected to the pump 18 at the intake side thereof.

The horizontal partition 95 is provided with an opening 102 into which is fitted a resilient seat bushing 103 having an opening 104 therethrough. The internal wall 99 of the eductor 97 is enlarged toward the lower end thereof to form a restricted opening 105, into which is fitted a resilient seat bushing 106 providing an opening 107 therethrough. A float 108 is positioned within the chamber 84 with its downwardly extending stem 109 passing freely through the openings 104 and 107 and through the restricted throat opening 96. The stem portion 109 carries two spaced balls, a small ball 110 adapted when the float 108 is in its uppermost position to seat against the seat 103, and a larger ball 111 adapted when the float 108 is in its lowermost position to seat against the seat 106. The stem 109 is of sufficiently less diameter than the openings 104, 96 and 107 to extend freely therethrough and permit fluid flow through these openings.

An air intake valve assembly, indicated generally by the reference numeral 112 is positioned in the lower wall of the casing 83. Said assembly comprises a casing 113 having a threaded end 114 threaded into an opening 115 in said lower casing wall. Said casing 113 is provided with a bore 116 extending completely therethrough and terminating at its upper end in a counterbored portion 117. A resilient seat 118 is fitted in said counterbore 117. The valve proper comprises a ball 119 adapted to seat on the seat 118 and having a stem portion 120 extending downwardly through said bore 116 and terminating in an enlarged end 121.

The operation of the air charger mechanism illustrated in Figure 3 may be described as follows:

When the level of the water within the tank 10 is at or above the dot and dash line K, the ball 90 of the check valve assembly 82 will be in its seated position; chamber 84 will be substantially filled with water and the float 108 will be in its raised position as illustrated in Figure 3, leaving the lower valve opening 107 open while maintaining the upper valve 104 closed by the ball 110.

When the pump 18 is started up, water will be caused to flow from the tank 10 through the nipple 82 and passage 94 down through the throat 96 of the eductor 97. Because of the reduced pressure at the throat portion of the eductor, water will be drawn from the chamber 84 through the opening 98 into said throat portion to be discharged downwardly into the pipe 100 leading to the intake of the pump 18. The float 108 will remain in its floating position until the water level in the chamber 84 drops sufficiently to be no longer able to buoy up said float.

During the continued flow of the water through the eductor 97, a reduction in pressure takes place within the chamber 84, with the result that the air intake valve ball 119 lifts off of its seat to permit air to be drawn into said chamber. When the float 108 reaches its lowermost position, the larger ball 111 closes off the valve passage 107 to stop the flow of water into the pipe 100.

Thereupon the water flowing from the tank 10 through the nipple 82 and passageway 94 flows up through the upper valve port 104, the ball 110 in this position being unseated, and out through the throat opening 98 into the chamber 84. In flowing into the chamber 84, the water expels the charge of air through the valve assembly 88 and through the fitting 81 back into the tank 10. The cycle is repeated as often as the pump 18 is started up, provided that the water level in the tank 10 is at or above the level indicated by the dot and dot and dash line K. When the water level is below that level, as for instance at the level indicated by the dotted line L, air merely is drawn in from the tank 10 and then forced back into the tank, the same as previously described.

In Figure 4, there is illustrated a further modification of my invention in which the referance numeral 125 indicates generally this modified form of air charger. As before, the air charger 125 is connected to the tank 10 at about the normal water level therein, as indicated by the dot and dash line K, through a fitting 126 and a check valve assembly 127. The air charger 125 is also connected at a lower point to the tank 10 through a nipple and fitting 128. Said air charger 125 comprises a casing 129 which is divided internally by a horizontal partition 130 into an upper chamber 131 and a lower chamber 132.

Said partition 130 and a continuation of the wall of the casing 129 provide a throat and discharge portion 133 and 134, respectively, of an eductor indicated generally by the reference numeral 135. The intake and constricted portions of said eductor 135 are provided by a tube 136 threaded into an opening 137 in the wall of said casing 129. Said tube 136 is threaded at its outer end, as at 138, to receive the threaded end of the nipple 128, and at its inner end is provided with inwardly tapering walls 139 providing a restricted throat portion 140 that is coaxially aligned with the throat portion 133. An annular passage 141 is formed between the conformingly tapered walls of said constricted portions 139 and 133.

A check valve assembly 142 is mounted in the lower wall 143 of an upper offset portion 144 of said casing 129. Said check valve assembly 142 includes a valve proper comprising a ball 145, adapted to seat upon a seat 146 and provided with a stem portion 147 freely extending through a bore 148 in said assembly. The lower end of said stem 147 is provided with an enlargement 149 to prevent complete upward displacement of said valve.

The casing 129 is connected through the lower wall, as at 150 to a pipe 151 leading to the intake side of the pump 18. A valve seat 152 is provided in the lower wall portion 150 for receiving a valve 153 controlled by a float 154. Said float 154 has a stem 155 which is pivoted, as at 156, to ears 157 attached to the inside of the casing wall. The valve 153 is pivotally suspended by means of a stem portion 158 from the float stem 155, as at 159.

The operation of the air charger illustrated in Figure 4 is as follows:

When the level of the water within the tank 10 is at or above the normal water level indicated by the dot and dash line K, the ball 160 of the check valve assembly 127 is seated to prevent the flow of water into the chamber 131. At the time the pump 18 starts up, the chambers 131 and 132 are both filled or substantially filled with water, since they are in open communication through the nipple 128 with the water in the tank 10 and therefore under tank pressure. The float 154 would therefore be in its elevated position, with the valve 153 unseated. Upon starting up the pump, the valve 153 being open, the suction effect of the pump draws water from the chamber 132 and creates a reduced pressure therein, causing water under tank pressure to be forced through the eductor 135 and to draw along with it water from the chamber 131. As the water level in the chamber 131 is lowered, air is drawn in through the check valve assembly 142 by reason of the drop in pressure. This continues until most of the water is drained out of chamber 131. The action of the eductor 135 is then to draw air or air and water from the chamber 131, where the air separates from the water. Ultimately the level of the water in the lower chamber 132 drops sufficiently to be no longer able to maintain the float 154 in its elevated position. Said float thereupon drops and seats the valve 153 upon its seat 152 to close off the piping 151 to the suction side of the pump.

At this point, water continues to flow from the tank through the nipple 128 into chambers 132 and 131 to fill these chambers. The valve 153 remains seated by reason of the difference in pressure between that in the chamber 132 and that in the suction line to the pump 18. The water will continue to run through the jet 135 until the pressure within the front chamber 132 and upper chamber 131 becomes equal to the tank pressure, at which time the flow of water through the jet will cease. The charge of air drawn into the chambers through the intake valve assembly 142 will, during this stage, be displaced through the check valve assembly 127 and the fitting 126 into said tank 10, due to the lightness of the air relative to the water and to the fact that the air is below the water level in the tank. The cycle is again ready to be repeated when the pump 18 starts up.

It will thus be seen that all modifications of the air charger mechanism herein described embody the same principle, namely one based upon the function of an eductor or aspirator to draw fluid into the reduced throat portion during its operation. In each instance water is withdrawn from the air charger by the action of the eductor until the level of water therein has dropped sufficiently to cause a float to drop and close a valve operated thereby to shut off piping leading to the suction side of the pump. During this removal of water from the air charger, a reduction in pressure is set up that results in the drawing in of air from the atmosphere to replace the water. Upon the closing off of the pipe leading to the suction side of the pump, water still continues to pass into the eductor, but instead of any eduction action occurring, the water spills out through the throat opening into the air charger to displace the air already drawn in and thereby expel such charge of air into the tank itself. The provision of a check valve capable of passing air in either direction but not of passing water from the tank into the air charger makes possible this automatic operation of my air charger to introduce a charge of air into the tank whenever the pressure of the tank is below a predetermined point and whenever the pump for supplying water to the tank is started up.

It will of course be understood that various details of construction may be varied through a wide range without departing from the principles of this invention and it is, therefore, not the purpose to limit the patent granted hereon otherwise than necessitated by the scope of the appended claims.

I claim as my invention:

1. An air charger for maintaining pneumatic pressure in a hydro-pneumatic tank in response to the tank pressure and the suction effect of the pump supplying water to said tank, said charger comprising a casing having an opening for connection to said tank and to said pump intake, an air intake into said casing, a Venturi-type aspirator operable upon a flow of water therethrough to draw water out of said casing and air through said air intake into said casing, and a float controlled valve operable upon said casing being substantially filled with air to close said opening for connection to said pump intake, whereupon continued flow of water through said aspirator fills said casing with water for expelling air therefrom into said tank.

2. An air charger for maintaining pneumatic pressure in a hydro-pneumatic tank in response to the tank pressure and the suction effect of the pump supplying water to said tank, said charger comprising a casing having a chamber therein and an opening for connection to said tank, a check valve for control of said opening for permitting air flow therethrough in either direction but not water flow from said tank, a valve controlled air intake into said chamber, said casing having an opening for connection to a source of water under pressure and an opening for connection to the suction side of said pump, a Venturi-type aspirator in flow communication between said last two openings and having a low pressure opening into said chamber, a float controlled valve controlling said opening for said pump intake connection and a float controlling said valve to open the same when said chamber is filled with water and to close the same when said chamber is substantially filled with air, the flow of water through said aspirator serving for drawing water from said chamber and for drawing air thereinto and finally for expelling said air through said check valve-controlled opening for connection to said tank.

3. An air charger for maintaining pneumatic pressure in a hydro-pneumatic tank in response to the tank pressure and the suction effect of the pump supplying water to said tank, said charger comprising a casing having a chamber therein and an opening for connection to said tank, a check valve for control of said opening for permitting air flow therethrough in either direction but not water flow from said tank, a valve controlled air intake into said chamber, said casing having an opening for connection to a source of water under pressure and having an opening for connection to the suction side of said pump, a Venturi-type aspirator in flow communication between said last two openings and having a low pressure opening into said chamber, a float controlled valve controlling said opening for said pump intake connection and a float in said chamber controlling said valve to open the same when said chamber is filled with water and to close the same when said chamber is substantially filled with air, the flow of water through said aspirator serving to draw water from said chamber and to draw air thereinto and finally to expel air through said check valve controlled opening for discharge into said tank.

4. An air charger for maintaining pneumatic pressure in a hydro-pneumatic tank in response to the tank pressure and the suction effect of the pump supplying water to said tank, said charger comprising a casing having a first opening for connection to said tank at about the normal water level therein, a second opening for connection to a supply of water under pressure, a third opening for connection to the suction side of said pump and a valve controlled intake for taking ambient air into a chamber of said casing, a check valve for control of said first opening for permitting air flow in either direction but not water flow from said tank into said chamber, a float controlled valve controlling said third opening, a Venturi-type aspirator in flow communication between said second and third openings and having a throat connection to said chamber, and a float in said chamber for actuating said float-controlled valve to close said third opening when said chamber is substantially filled with air and to open said third opening when said chamber is filled with water.

5. An air charger for maintaining pneumatic pressure in a hydro-pneumatic tank in response to the tank pressure and the suction effect of the pump supplying water to said tank, said air charger comprising a casing providing a chamber having openings for connection to said tank and to the intake of said pump, a float within said chamber having a valve attached thereto for controlling said pump intake opening, an air intake valve for admitting air into said chamber, said chamber having one of said openings near the top thereof for check-valve-controlled connection for discharge into said tank for permitting the passage of air in either direction but not flow of water from said tank to said chamber, a Venturi-type aspirator associated with said chamber and operable by the flow of water under pressure therethrough for drawing air through said intake valve into said chamber and subsequently on the closing of said float controlled valve for displacing said air through said check valve controlled opening for discharge into said tank.

6. An air charger for maintaining pneumatic pressure in a hydro-pneumatic tank in response to the tank pressure and the suction effect of the pump supplying water to said tank, said charger comprising a casing providing a chamber having a first opening for connection to said tank, a second opening for connection to a supply of water under pressure, a third opening for connection to the suction side of said pump and a valve controlled air intake, a check valve for controlling said first opening for permitting air flow in either direction but not water flow from said tank to said chamber, a float controlled valve controlling said third opening, a Venturi-type aspirator associated with said chamber and said second opening and operable by the flow of said water under pressure therethrough for drawing air into said chamber through said intake valve and upon the closing of said float controlled valve for displacing said air through said check valve controlled first opening for discharge into said tank.

7. An air charger system for maintaining pneumatic pressure within a hydro-pneumatic tank in response to tank pressure and the suction effect of the pump supplying water to said tank, said charger comprising a casing having an opening for connection to said tank at about the normal water level therein and also at a level below the normal water level and an opening for connection to said pump intake, an air intake and a Venturi-type aspirator associated with said casing and operative on the pressure flow of water through said Venturi-type aspirator for drawing air into the system through said air intake when the water level is above said normal water level opening and for causing the air so drawn in to pass through said last mentioned opening for discharge into said tank.

8. Air charger for maintaining pneumatic pressure in a hydro-pneumatic tank in response to tank pressure and the suction effect of the pump supplying water to said tank, said charger comprising a casing having a valve-controlled intake, means associated with said casing defining a water flow passage for connection at one end to the tank and at the other end to the suction side of the pump, a Venturi-type aspirator constituting a part of said passage and having a constricted throat and an opening from said throat into said casing interior to draw water out of and air into said casing interior when water flows through said passage, and a float controlled valve operable upon said casing interior being substantially filled with air to close the end of said passage to said suction side of the pump, whereupon continued flow of water through said aspirator fills said casing with water expelling air therefrom for passage into said tank.

9. An air charger for maintaining pneumatic pressure in a hydro-pneumatic tank in response to the tank pressure and the suction effect of a pump supplying water to said tank, comprising a casing having an opening for connection to said tank and to said pump intake, an air intake into said casing, a Venturi-type aspirator operable upon a flow of water from said tank therethrough to draw air through said air intake into said casing, and a float controlled valve operable upon said casing being substantially filled with air to close said opening for connection to said pump intake, whereupon water flows from said tank into said casing to displace the body of air from within said casing into said tank.

ARTHUR W. BURKS.

REFERENCES CITED

The following references are of record in the file of this patent:

UNITED STATES PATENTS

| Number | Name | Date |
|---|---|---|
| 2,172,057 | Burks | Sept. 5, 1939 |
| 2,172,097 | Burks | Sept. 5, 1939 |